US012243698B2

(12) United States Patent
Loglisci et al.

(10) Patent No.: US 12,243,698 B2
(45) Date of Patent: Mar. 4, 2025

(54) NON-ELECTRICAL DEVICE FOR REPLACING A CURRENT SENSOR IN AN ARC-EXTINGUISHING CHAMBER OF A SWITCH-DISCONNECTOR, AND A SWITCH-DISCONNECTOR COMPRISING SUCH A NON-ELECTRICAL DEVICE

(71) Applicant: Schneider Electric Industries SAS, Rueil Malmaison (FR)

(72) Inventors: David Loglisci, Vaulnaveys le Haut (FR); Frédéric Brasme, Le Bourg d'Oisans (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 18/369,375

(22) Filed: Sep. 18, 2023

(65) Prior Publication Data

US 2024/0096575 A1 Mar. 21, 2024

(30) Foreign Application Priority Data

Sep. 20, 2022 (FR) ....................................... 2209492

(51) Int. Cl.

| | |
|---|---|
| ***H01H 33/73*** | (2006.01) |
| ***H01H 9/08*** | (2006.01) |
| ***H01H 9/30*** | (2006.01) |
| ***H01H 9/34*** | (2006.01) |

(52) U.S. Cl.

CPC .............. *H01H 33/73* (2013.01); *H01H 9/08* (2013.01); *H01H 9/346* (2013.01); *H01H 2009/305* (2013.01); *H01H 2225/006* (2013.01); *H01H 2225/012* (2013.01)

(58) Field of Classification Search

CPC .... H01H 33/73; H01H 9/08; H01H 2009/305; H01H 2225/006; H01H 2225/012

See application file for complete search history.

(56) References Cited

U.S. PATENT DOCUMENTS

| | | | | |
|---|---|---|---|---|
| 8,575,504 B2 * | 11/2013 | Eisner | H01H 19/02 335/201 |
| 2016/0178661 A1 * | 6/2016 | Olivier | B23K 26/21 324/156 |
| 2019/0162786 A1 | 5/2019 | Zabrocki et al. | |

FOREIGN PATENT DOCUMENTS

| | | |
|---|---|---|
| DE | 102017127888 A1 | 5/2019 |
| FR | 3030763 A1 | 6/2016 |

OTHER PUBLICATIONS

French Search Report and Written Opinion dated May 8, 2023 for corresponding French Patent Application No. 2209492, 6 pages.

* cited by examiner

*Primary Examiner* — Jared Fureman
*Assistant Examiner* — Duc M Pham
(74) *Attorney, Agent, or Firm* — Troutman Pepper Locke LLP

(57) ABSTRACT

A non-electrical device (40) includes first and second half-housings which are produced in a plastic material, are joined fixedly to one another, define an axis along which a passage for an electrical conductor passes through the first and second half-housings, and delimit between them an internal volume, which is separated from the passage and which surrounds the passage all around the axis. The first half-housing incorporates, by moulding, mechanical reinforcing elements which extend substantially parallel to the axis in the internal volume until they are in contact with the second half-housing.

12 Claims, 9 Drawing Sheets

NON-ELECTRICAL DEVICE FOR REPLACING A CURRENT SENSOR IN AN ARC-EXTINGUISHING CHAMBER OF A SWITCH-DISCONNECTOR, AND A SWITCH-DISCONNECTOR COMPRISING SUCH A NON-ELECTRICAL DEVICE

TECHNICAL FIELD

The present invention concerns a non-electrical device for replacing a current sensor in an arc-extinguishing chamber of a switch-disconnector. It also concerns a switch-disconnector including such a non-electrical device.

BACKGROUND

In a manner known in itself a switch-disconnector is a switch which in its open position satisfies the isolation conditions of a disconnector. Thus the switch-disconnector combines in the same device a load disconnection function typical of a switch and an isolation function typical of a disconnector. The isolator-disconnector therefore makes it possible to guarantee the safety of operatives having to work on an electrical circuit connected to the switch-disconnector as soon as the latter is open. Unlike a circuit-breaker, which incorporates an additional function of protection against abnormal conditions that the circuit-breaker detects itself, such as a current surge, a short-circuit or a voltage surge, the switch-disconnector is opened from outside the switch-disconnector, either manually or by a unit for detecting abnormal conditions external to the switch disconnector.

It is routine in the field to propose a switch-disconnector that is a version of a circuit-breaker from which the electrical components providing the aforementioned protection function have been removed. Such an approach makes it possible to rationalise the device ranges by using the same components and assemblies of components found identically in a switch-disconnector version of the same given device. This approach necessitates adjustments at the level of the arc-distinguishing chamber, however. In fact, in the circuit-breaker version of the device a current sensor used to detect the aforementioned abnormal conditions is generally present in the arc-extinguishing chamber. In the switch disconnector version a current sensor of this kind is of no utility but cannot be removed as such because this would modify the geometrical characteristics of the arc-extinguishing chamber, with the risk of degrading isolation performance, in particular the capacity of the arc-extinguishing chamber to extinguish the electrical arc formed on opening the switch-disconnector.

To circumvent this difficulty it is known in the field to replace the aforementioned current sensor by a "dummy sensor", that is to say a non-electrical device substituted for the current sensor in the arc-extinguishing chamber of the switch-disconnector. This "dummy sensor" includes a housing, typically made of a plastic material, that is globally identical to that of the current sensor to be substituted but is deprived internally of any electrical component to the benefit of an added insert. This insert consists of a moulded and glued resin and enables the housing to remain intact on opening of the switch-disconnector by absorbing the pressure surge applied to the housing that the electrical arc creates in the arc-extinguishing chamber. Although this "dummy sensor" with resin insert is generally efficacious in preserving the isolation performance of the switch-disconnector version of a given device compared to the circuit-breaker version of that device, it is not completely satisfactory, in particular from an environmental and standards point of view.

SUMMARY

The aim of the present invention is to propose a new "dummy sensor" that is particularly robust and the behaviour of which is reliable and controlled.

To this end the invention has for object a non-electrical device for replacing a current sensor in an arc-extinguishing chamber of a switch-disconnector, that non-electrical device comprising first and second half-housings which:

- are produced in a plastic material,
- are joined fixedly to one another,
- define an axis along which a passage for an electrical conductor passes through the first and second half-housings, the passage being substantially centered on the axis, and
- delimit between them an internal volume which is separated from the passage and which surrounds the passage all around the axis.

In this non-electrical device the first half-housing incorporates by moulding mechanical reinforcing elements which extend substantially parallel to the axis in the internal volume until they are in contact with the second half-housing.

One idea behind the invention is to employ a solution with no added insert, in particular one made of resin, to the benefit of arrangements completely in one piece with the housing of the non-electrical device forming the "dummy sensor". To this end the invention provides for the plastic housing of the non-electrical device to consist of two half-housings joined fixedly to one another and for mechanical reinforcing elements to be in one piece with a first of the two half-housings and to form a support by contact for the second half-housing, these mechanical reinforcing elements extending in the internal volume of the housing substantially parallel to the axis along which the housing has passed through it a passage for an electrical conductor on which the non-electrical device is mounted in service, in particular in a switch-disconnector. The mechanical reinforcing elements make it possible to maintain the integrity of the housing and thereby of the non-electrical device according to the invention when the latter are subjected in an arc-extinguishing chamber of a switch-disconnector to the pressure surge created by the formation of an electrical arc on opening the switch-disconnector. As the mechanical reinforcing elements are incorporated by moulding in the first half-housing their specific structural features can be defined with precision and repeatably and their behaviour is controlled. Moreover, the inventors have been able to validate and to optimise by numerical simulation characteristics, in particular of shape and of placement, relating to the mechanical reinforcing elements. In practice the choice between the two half-housings of the first half-housing to incorporate the mechanical reinforcing elements is advantageously made in conjunction with rheological mouldability considerations. The non-electrical device according to the invention may advantageously be limited to the two half-housings, in particular dispensing with any filling added in its internal volume. Moreover, as described in detail hereinafter, the effects and benefits of the mechanical reinforcing elements can be reinforced by providing that at least some of these mechanical reinforcing elements are advantageously distributed in one or more groups each of which preferably consists of at least three mechanical reinforcing elements and in each of which the mechanical reinforcing elements are aligned, advantageously occupying a region of the internal volume offset from the passage for the electrical conductor. Also, as described in detail hereinafter, the non-electrical device according to the invention can provide other arrangements aimed at strengthening performance.

Thus, in accordance with additional advantageous features of the non-electrical device according to the invention, separately or in all technically possible combinations:

The non-electrical device consists of first and second half-housings.

The internal volume is, apart from the mechanical reinforcing elements, left substantially empty, in particular being free of any added resin.

At least some of the mechanical reinforcing elements belong to at least one group all the mechanical reinforcing elements of which are aligned in a direction transverse to the axis.

The volume consists of two adjoining sub-volumes, namely:

An annular sub-volume that directly surrounds the passage and extends all around the axis, and A remote sub-volume that is farther from the axis than the annular sub-volume and extends only partly around the axis, hich all the mechanical reinforcing elements of the or each group being disposed in the remote sub-volume.

The or each group consists of at least three mechanical reinforcing elements that are substantially regularly distributed in said direction transverse to the axis.

The mechanical reinforcing elements of the or of each group are in one piece.

The first and second half-housing include respective bottom walls that are disposed facing one another along the axis and each of which separates the internal volume from the outside of the non-electrical device, and each mechanical reinforcing element projects along the axis from the bottom wall of the first half-housing to a free end of the mechanical reinforcing element, that free end being in contact along the axis with the bottom wall of the second half-housing.

Each of the mechanical reinforcing elements incorporates ribs each of which extends from the bottom wall of the first half-housing to the free end of the mechanical reinforcing element.

The first half-housing incorporates by moulding projecting elements that are disposed outside the internal volume and are adapted during assembly of the first and second half-housings to be clipped into complementary recesses provided by the second half-housing outside the internal volume.

The invention also for object a switch-disconnector including one or more poles and an insulating enclosure that supports the pole or poles. The or each pole includes:

two terminal pads that are carried by the enclosure and that can be connected from outside the enclosure to an electrical circuit to be isolated by the switch-disconnector, two contact elements that are disposed in an arc distinguishing chamber delimited inside the enclosure and are respectively connected to the terminal pads while being movable relative to one another into a closed position in which the contact elements are in direct contact with one another and an open position, in which the contact elements are separated from one another, a mechanism that is arranged inside the enclosure, controlled from outside the enclosure and adapted to move the contact elements from the closed position to the open position, and a non-electrical device as defined hereinabove arranged in the arc extinguishing chamber in such a manner that one of the two terminal pads is received in the passage, extending substantially parallel to the axis.

In accordance with an additional advantageous feature of the switch-disconnector according to the invention the first half-housing is directly intercalated along the axis between the enclosure and the second half-housing.

BRIEF DESCRIPTION OF THE DRAWINGS

The invention will be better understood on reading the following description given by way of example only and with reference to the drawings, in which.

DETAILED DESCRIPTION

Figure 1:
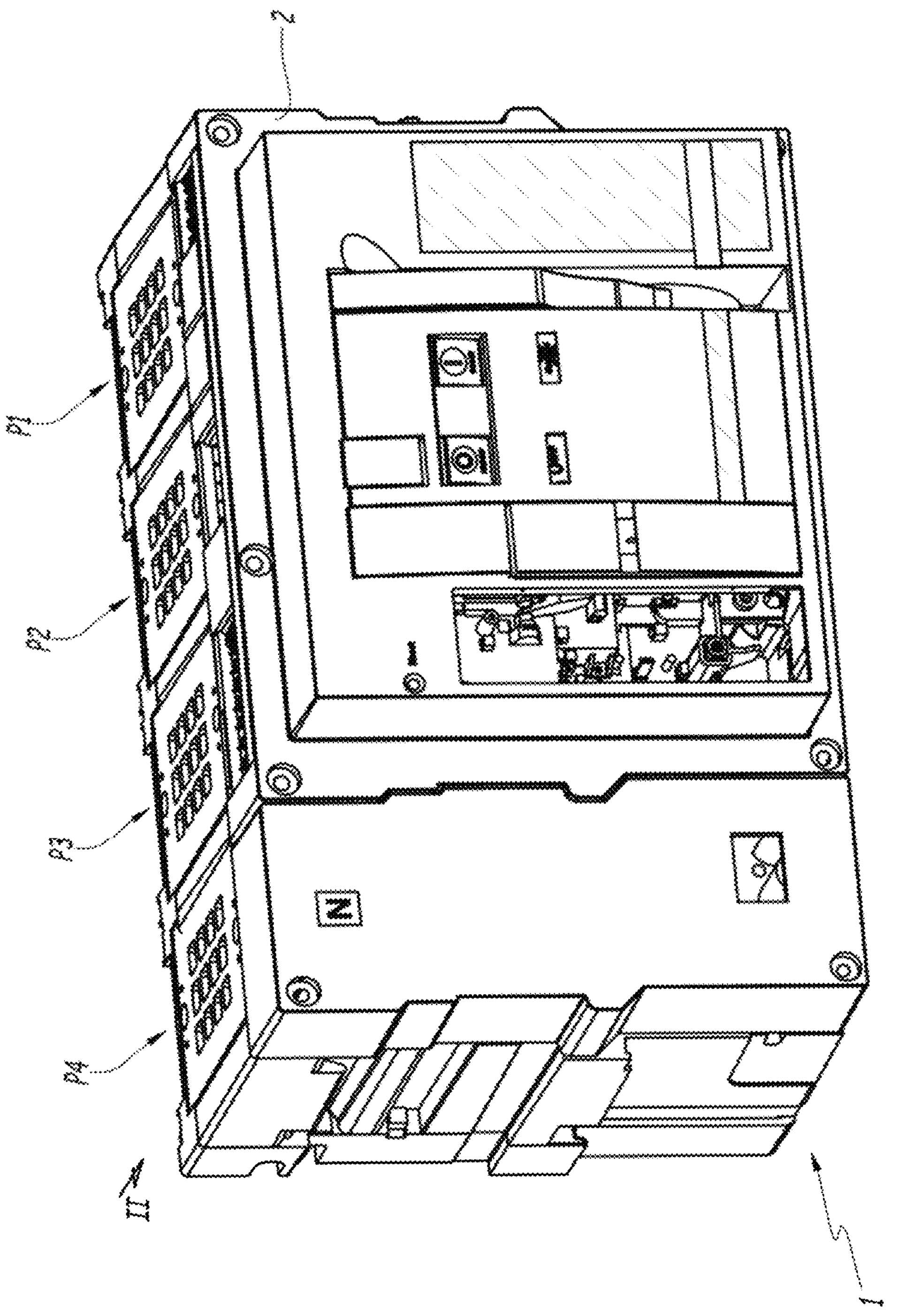
FIG. 1 is a perspective view of a switch-disconnector in accordance with the invention.
Figure 2:
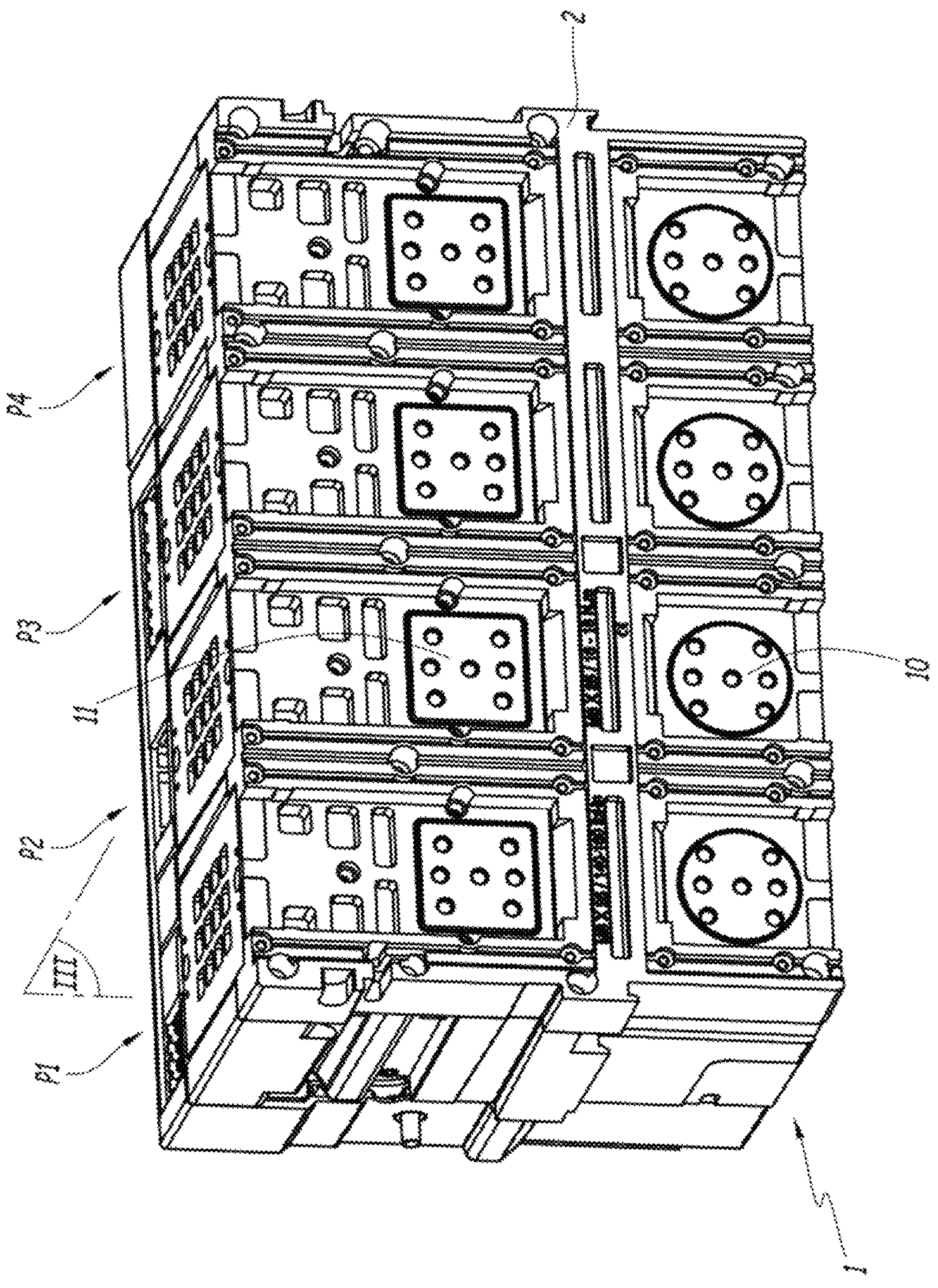
FIG. 2 is a perspective view in the direction of the arrow II in FIG. 1.
Figure 3:
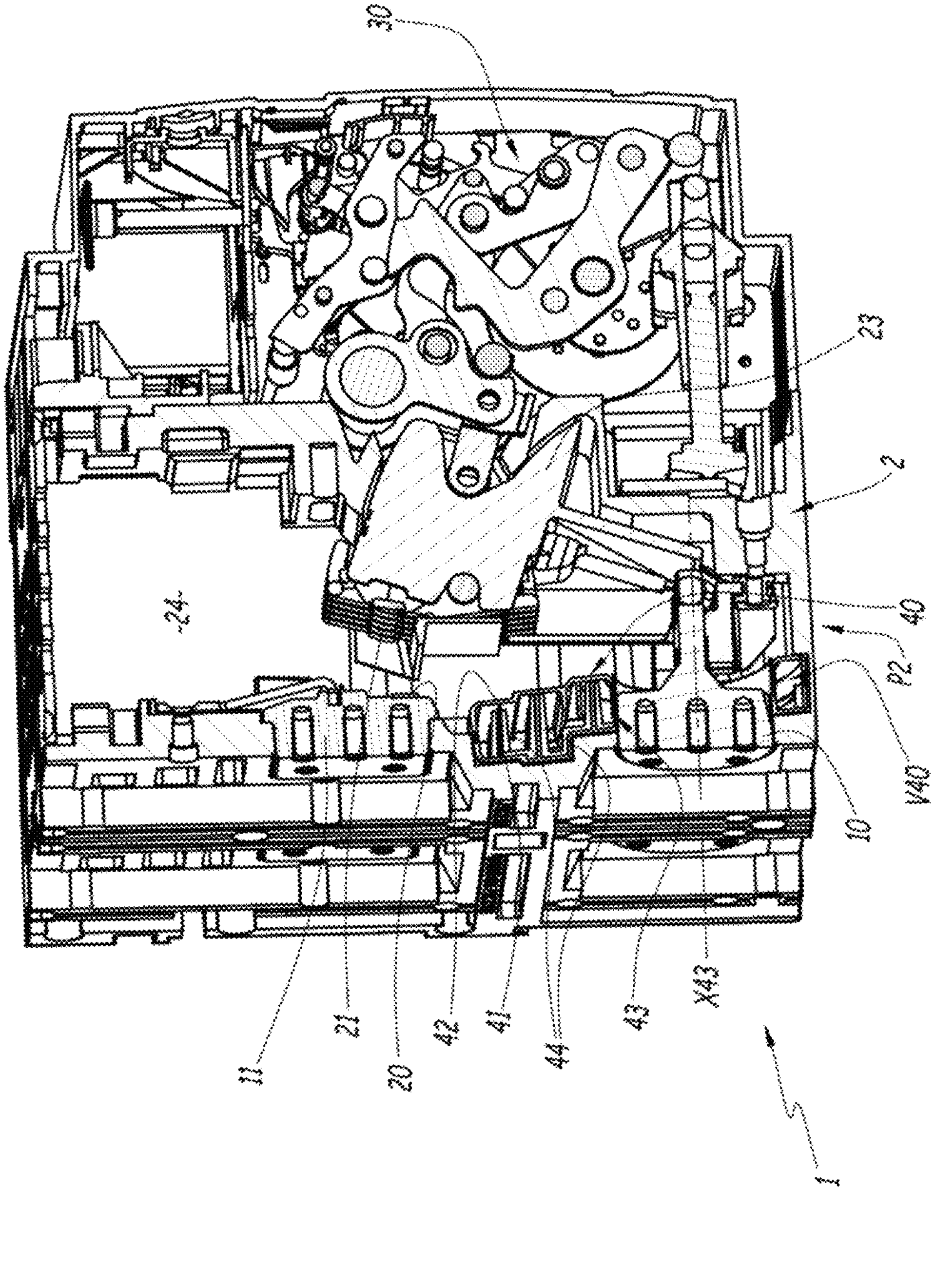
FIG. 3 is a section on the section plane III in FIG. 2.
Figure 4:
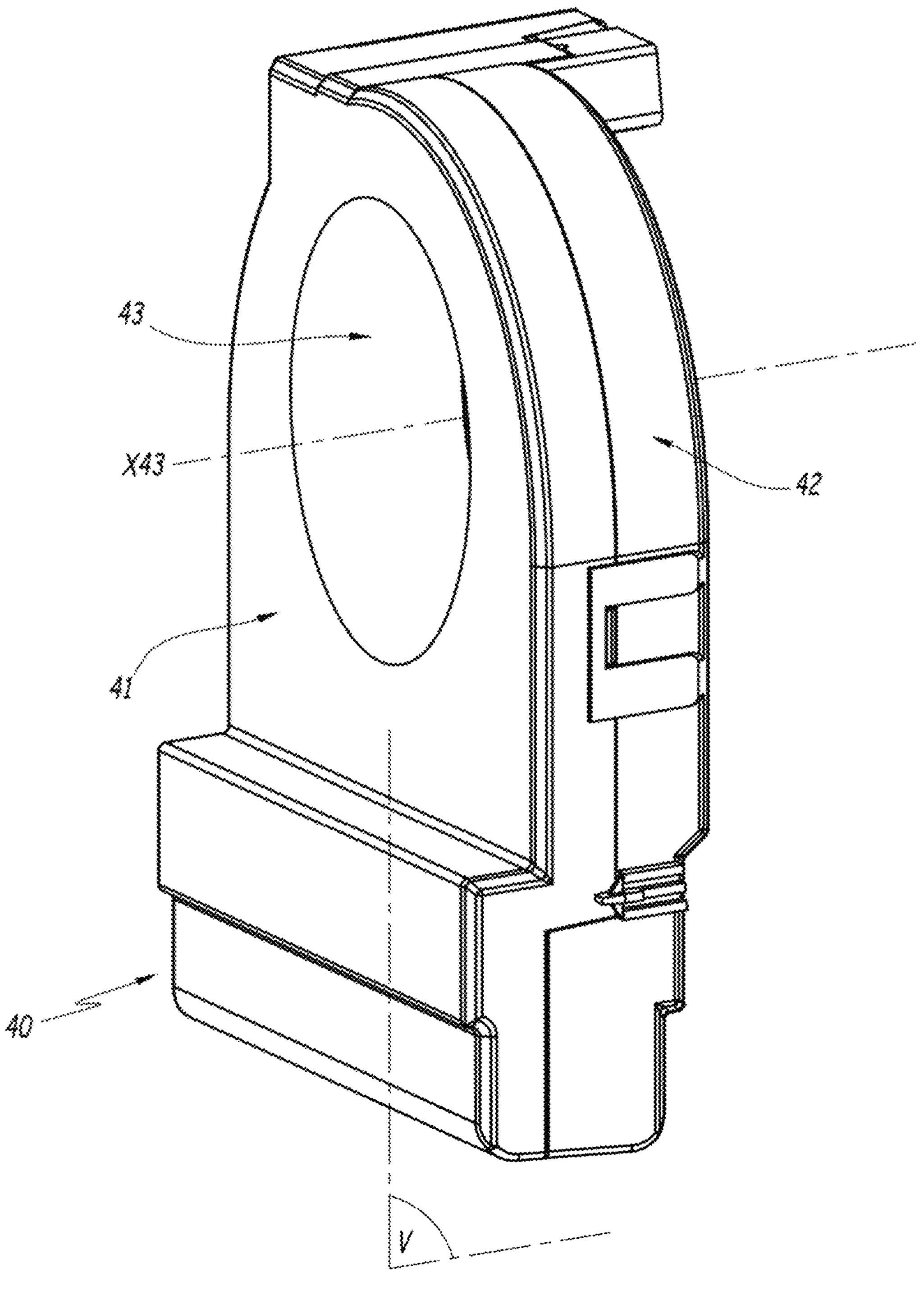
FIG. 4 is a perspective view of a non-electrical device in accordance with the invention that is part of the switch-disconnector in the preceding figures.

In FIGS. 1 to 3 there is represented a switch-disconnector 1 employing in-air arc extinction that enables isolation of the electrical systems that are connected to it. The switch-disconnector 1 is typically a high-power switch-disconnector, in particular a high-current switch-disconnector in the sense that, in the normally closed state of the switch-disconnector 1 the latter allows circulation through it of a permanent DC or AC current the intensity of which is between a few hundred and a few thousand amperes, in particular between 500 A and 7500 A inclusive.

Here the switch-disconnector 1 is a multipolar switch-disconnector, being intended to be used in an electrical circuit including a plurality of electrical poles. In the example depicted in the figures the switch-disconnector 1 includes four independent poles P1, P2, P3 and P4. In a variant that is not represented the switch-disconnector 1 includes a different number of poles, for example two or three. Also in a variant that is not represented the switch-disconnector 1 includes only one pole.

The switch-disconnector 1 includes an insulating enclosure 2 that supports the poles P1 to P4. The enclosure 2 is for example made of a plastic material and includes a plurality of parts joined fixedly to one another. The enclosure 2 delimits an internal volume that is essentially closed and here is divided into four separate compartments associated with the poles P1 to P4, respectively.

Each of the poles P1 to P4 being identical to the other poles, there is described in detail hereinafter only one of them, namely the pole P2 that is shown in section in FIG. 3. The description given for the pole P2 applies to each of the other poles P1, P3 and P4.

The pole P2 includes two terminal pads 10 and 11 that enable connection of the pole P2 to an electrical circuit that it is wished to be able to isolate by means of the switch-disconnector 1. The terminals pads 10 and 11, which are made of an electrically conductive material, generally a metal such as copper, are carried by the enclosure 2 in such a manner as to be electrically connectable from outside the enclosure 2 to the aforementioned electrical circuit. Here the terminal pads 10 and 11 pass through a dedicated wall of the enclosure 2, emerging on either side of that dedicated wall on the outside of the enclosure 2 and on the inside of the enclosure 2, in other words in the internal volume of the latter, to be more precise inside the compartment of that internal volume associated with the pole P2.

The pole P2 also includes two contact elements 20 and 21 that are connected to the terminal pads 10 and 11, respectively, being movable with respect to one another between a closed position that is not represented and an open position that is represented in FIG. 3. In the closed position the contact elements 20 and 21 are in direct contact with one another and enable the circulation of an electrical current between the terminal pads 10 and 11. In their open position the contact elements 20 and 21 are separated from one another and interrupt the electrical circulation between the terminals pads 10 and 11.

In the embodiment considered in the figures the contact element 20 is fixedly carried by a mobile arm 23 that is electrically connected to the terminal pad 10 whereas the contact element 21 is fixedly carried by the terminal pad 11 which is itself fixedly carried by the enclosure 2.

In all cases the contact elements 20 and 21 are disposed in an arc extinguishing chamber 24 associated with the pole P2. The arc extinguishing chamber 24 is delimited inside the enclosure 2, thus forming a part of the internal volume of the latter, to be more precise part of the compartment of that internal volume associated with the pole P2. The arc extinguishing chamber 24 is filled with air and surrounds the contact elements 20 and 21 in such a manner as to favour extinction of the electrical arc formed between the contact elements 20 and 21 when the latter go from their closed position to their open position. Between its formation and its extinction the electrical arc ironises the air present in the arc extinguishing chamber 24, which generates gases, known as arc extinction gases, that are partially ionised and contain particles in suspension, such as soot and/or metal particles. The formation of this electrical arc creates in the arc extinguishing chamber 24 an increased pressure generating mechanical forces both on the parts of enclosure 2 that delimit the arc extinguishing chamber 24 and on the components of the switch-disconnector 1 that are disposed in the arc extinguishing chamber 24.

The pole P2 also includes a mechanism 30 for opening the switch-disconnector 1, that is to say for moving the contact elements 20 and 21 from the closed position to the open position. The mechanism 30 is arranged inside the enclosure 2, to be more precise in the compartment of the internal volume of the latter associated with the pole P2. In practice the mechanism 30 is known in itself in the field and will therefore not be described further. In other words, the specific features of the mechanism 30 are not limiting on the invention. In the embodiment considered here the mechanism 30 is designed to move the mobile arm 23 in order to move the contact elements 20 and 21 between their closed and open positions. The mechanism 30 is advantageously designed so that when it is actuated to move the contact elements 20 and 21 from their closed position to their open position it leads to opening of the contact elements of the other poles P1, P3 and P4 of the switch-disconnector 1, in particular by means of mechanisms similar to the mechanism 30 of the pole P2 that are parts of the poles P1, P3 and P4, respectively.

The mechanism 30 is actuated from outside the enclosure 2, in particular either manually or by an ad hoc control unit that is not integrated into the switch-disconnector 1. A result of this is that the arc extinguishing chamber 24 does not need to contain a current sensor which, mounted on one of the terminal pads 10 and 11, would measure the electrical current circulating therein to signal a potential malfunction, such as a current surge, a short circuit or a voltage surge.

The pole P2 also includes a non-electrical device 40 that can be seen in FIG. 3 and is represented in isolation in FIGS. 4 to 9. This non-electrical device 40 makes it possible to replace the current sensor just referred to, substantially occupying the space that this current sensor would have occupied in the switch-disconnector 1, for the reasons explained in detail in the introductory part of the present document. In other words the non-electrical device 40 constitutes a “dummy sensor” in the sense defined above.

Accordingly, as clearly visible in FIG. 3 the non-electrical device 40 is arranged inside the enclosure 2, to be more precise in the compartment of the internal volume of the latter associated with the pole P2, being disposed in the arc extinguishing chamber 24.

As represented in FIGS. 3 to 7 the non-electrical device 40 includes a housing consisting of two half-housings 41 and 42. The half-housing 41 is represented in isolation in FIG. 8 and the half-housing 42 is represented in isolation in FIG. 9. The two half-housings 41 and 42 are made of a moulded plastic material. In the embodiment considered in the figures the non-electrical device 40 advantageously consists of the half-housings 41 and 42, that is to say the non-electrical device 40 includes no component other than the two half-housings 41 and 42.

In all cases the half-housings 41 and 42 are joined fixedly to one another. The implementation of the fixed joining between the two half-housings 41 and 42 is not limiting on the invention, and it is pointed out that this aspect will be discussed in more detail hereinafter.

In the assembled state of the non-electrical device 40 the half-housings 41 and 42 have a passage 43 passing through them along an axis X43 on which the passage 43 is centred. The half-housings 41 and 42 are therefore arranged in succession along the axis X43. In the assembled state of the switch-disconnector 1 the terminal pad 10 is received in the passage 43, here in a complementary manner, extending parallel to the axis X43 and even, as here, being aligned on the axis X43. The housing consisting of the half-housings 41 and 42 therefore has the terminal pad 10 pass through it via the passage 43 and is arranged in the arc extinguishing chamber 24 so that the half-housing 41 is, along the axis X43, facing and disposed against a part of the enclosure 2 through which the terminal pad also passes along the axis X43, whereas the half-housing 42 faces the arc extinguishing chamber 24. The half-housing 41 is therefore located, along the axis X43, directly between the enclosure 2 and the half-housing 42.

Figure 5:
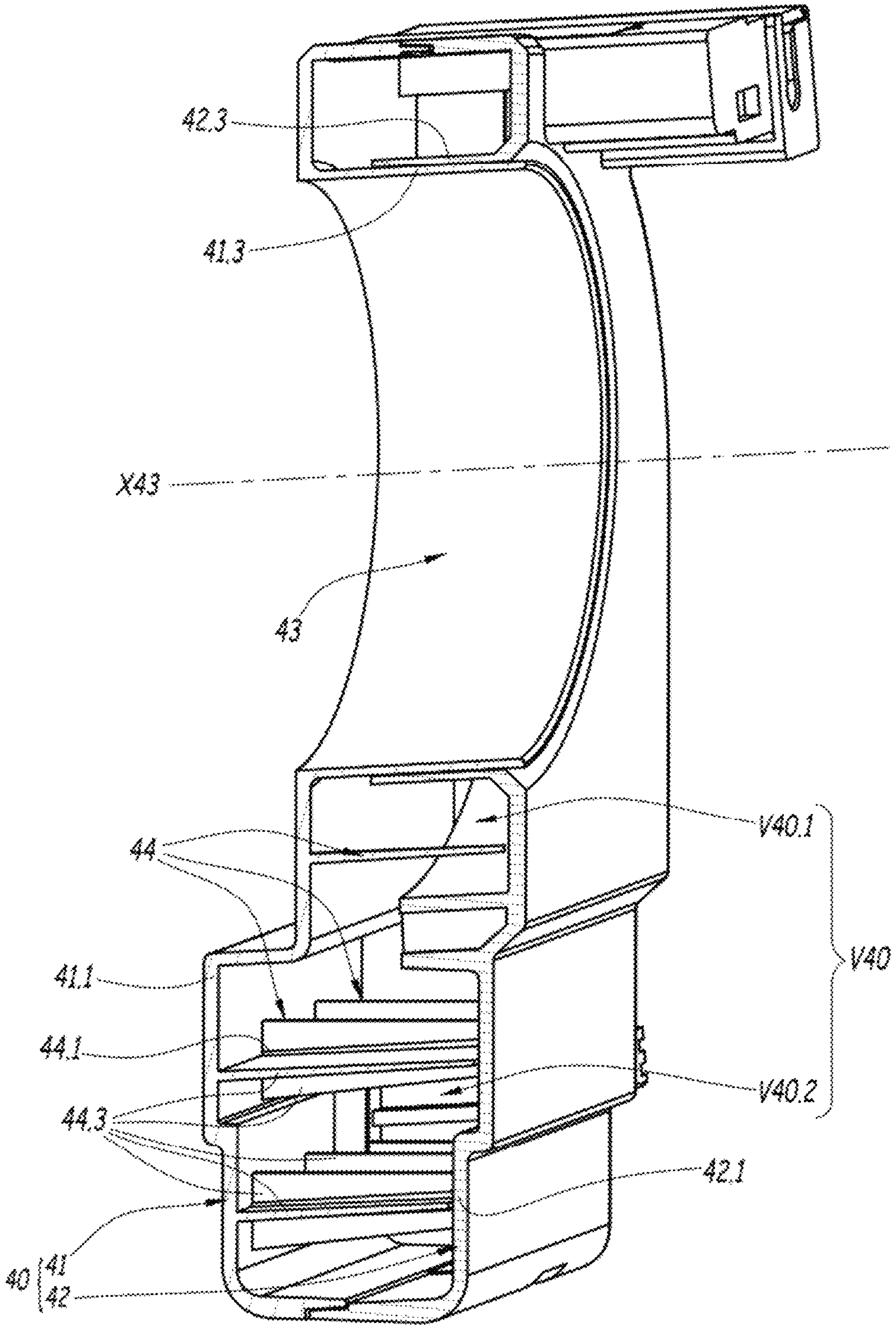
FIG. 5 is a section on the section plane V in FIG. 4.
Figure 6:
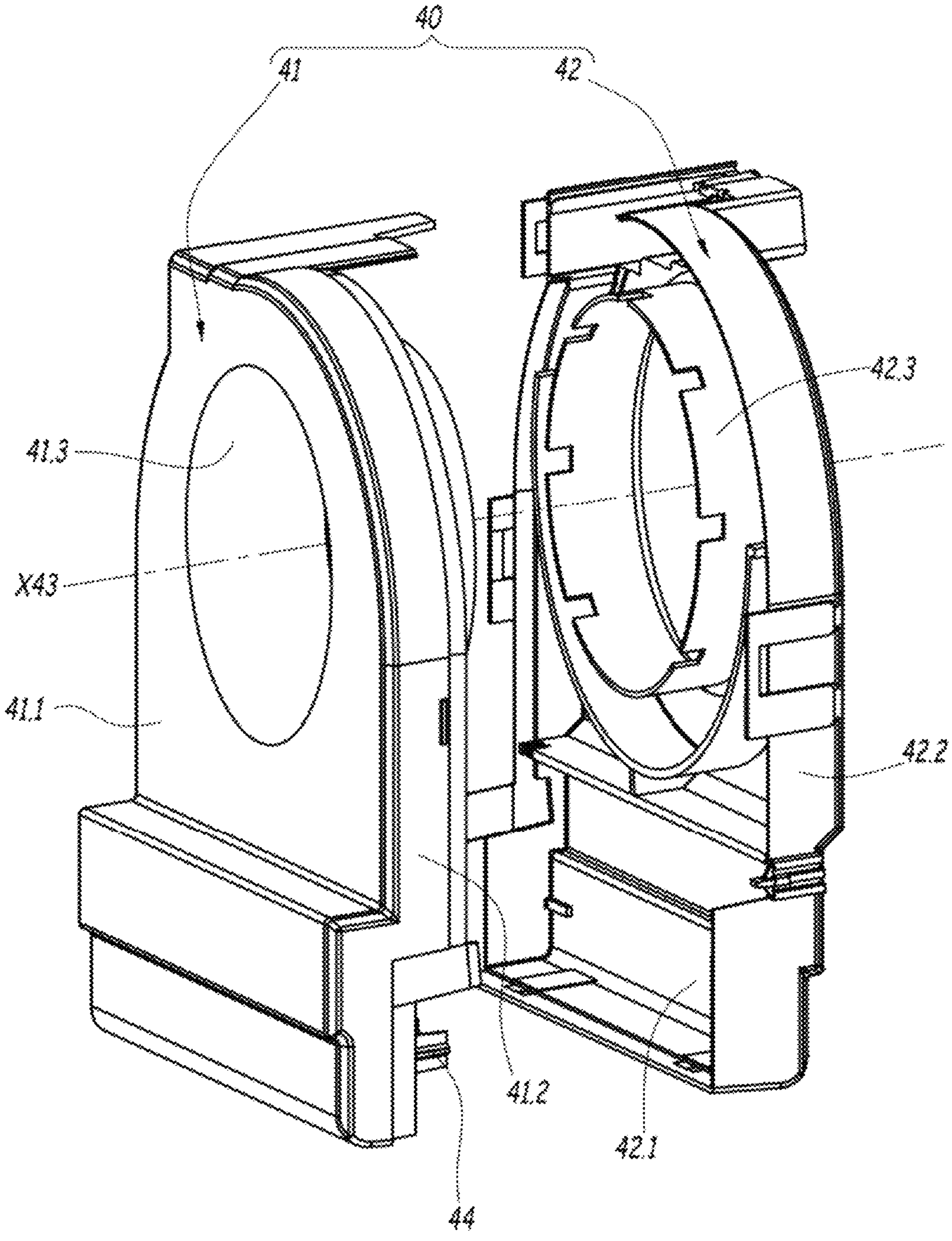
FIG. 6 is an exploded perspective view of the non-electrical device from FIG. 4.
Figure 7:
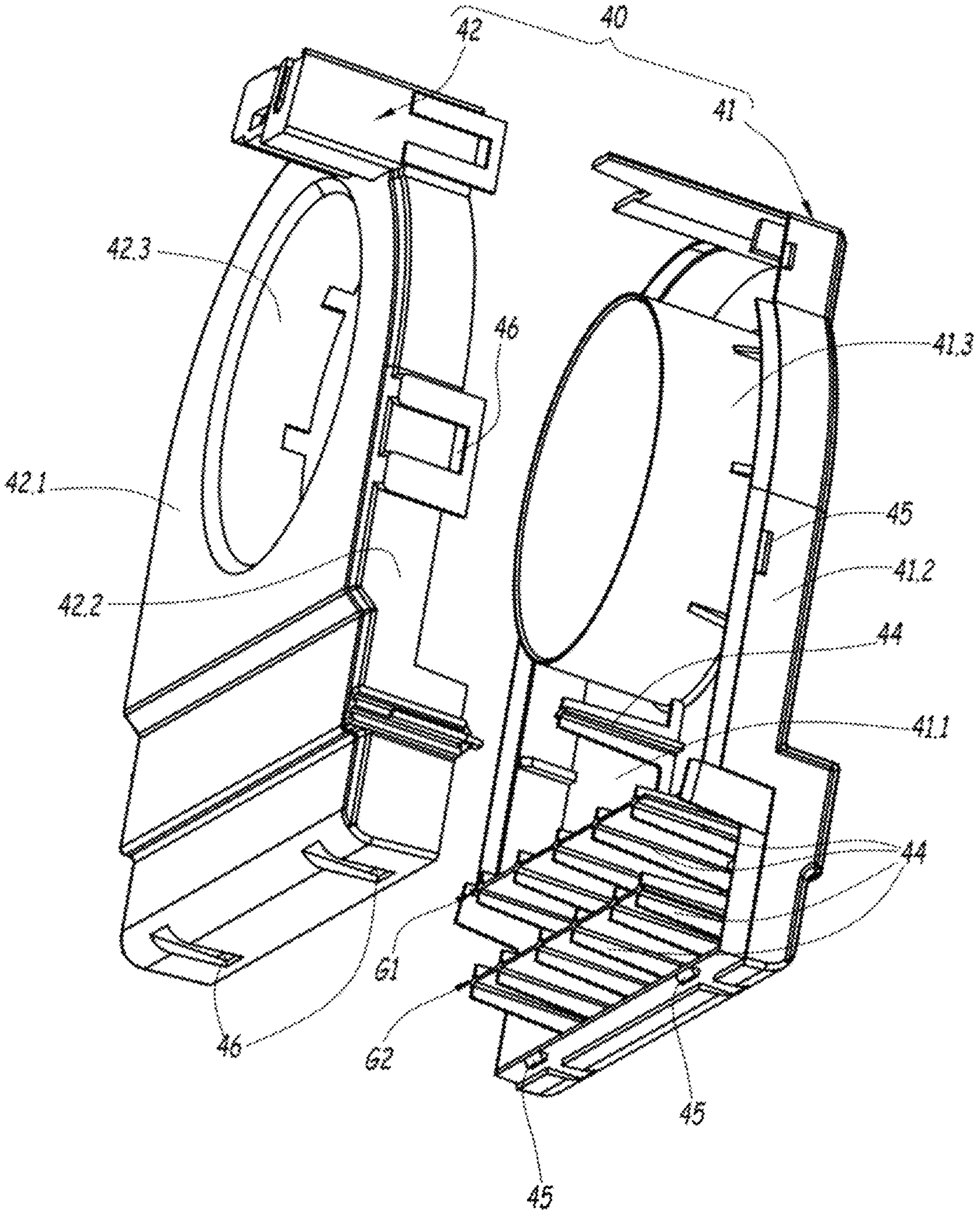
FIG. 7 is a view similar to FIG. 6 from a different observation angle.
Figure 8:
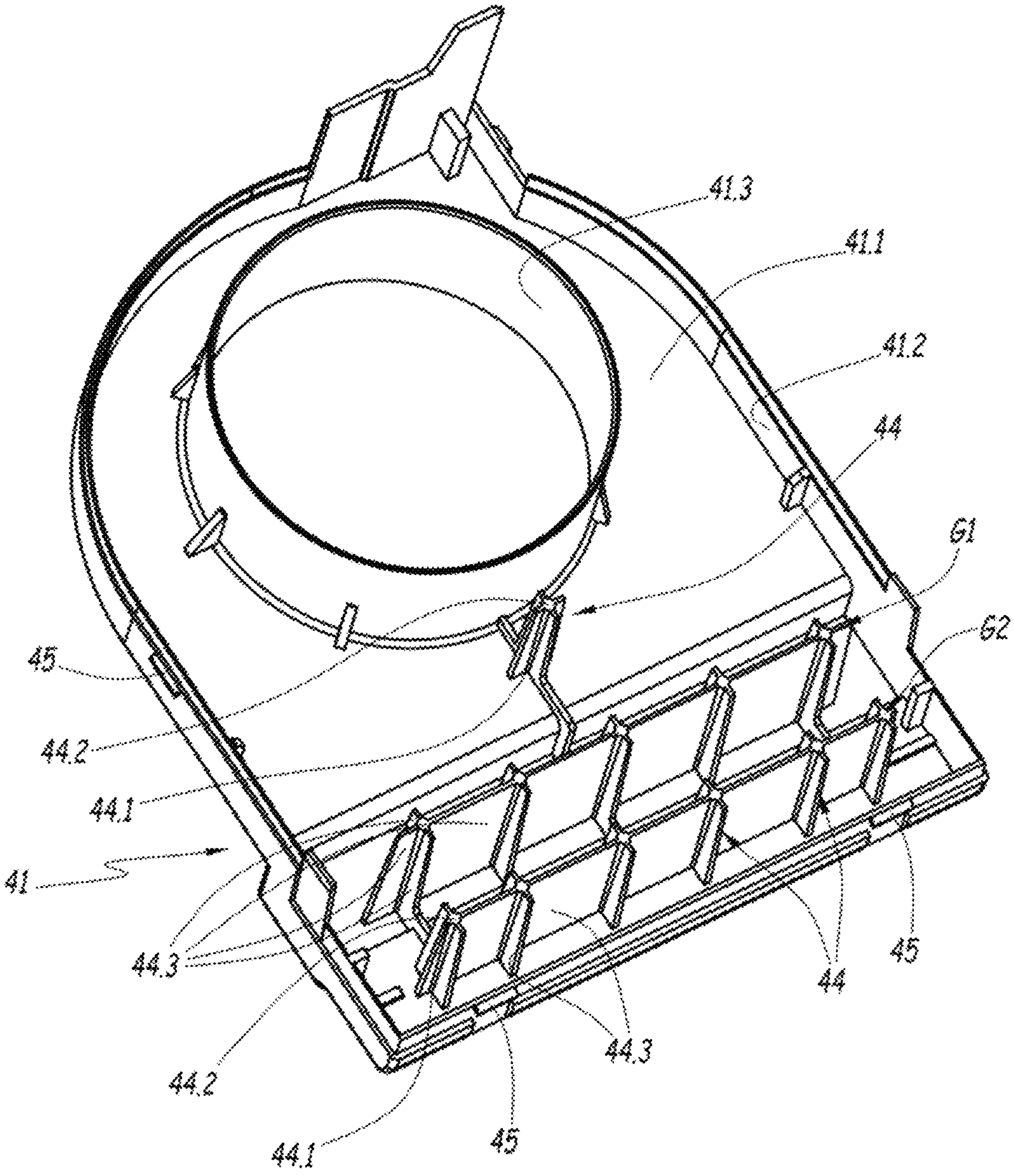
FIG. 8 is a perspective view of a half-housing that is part of the non-electrical device from FIG. 4.
Figure 9:
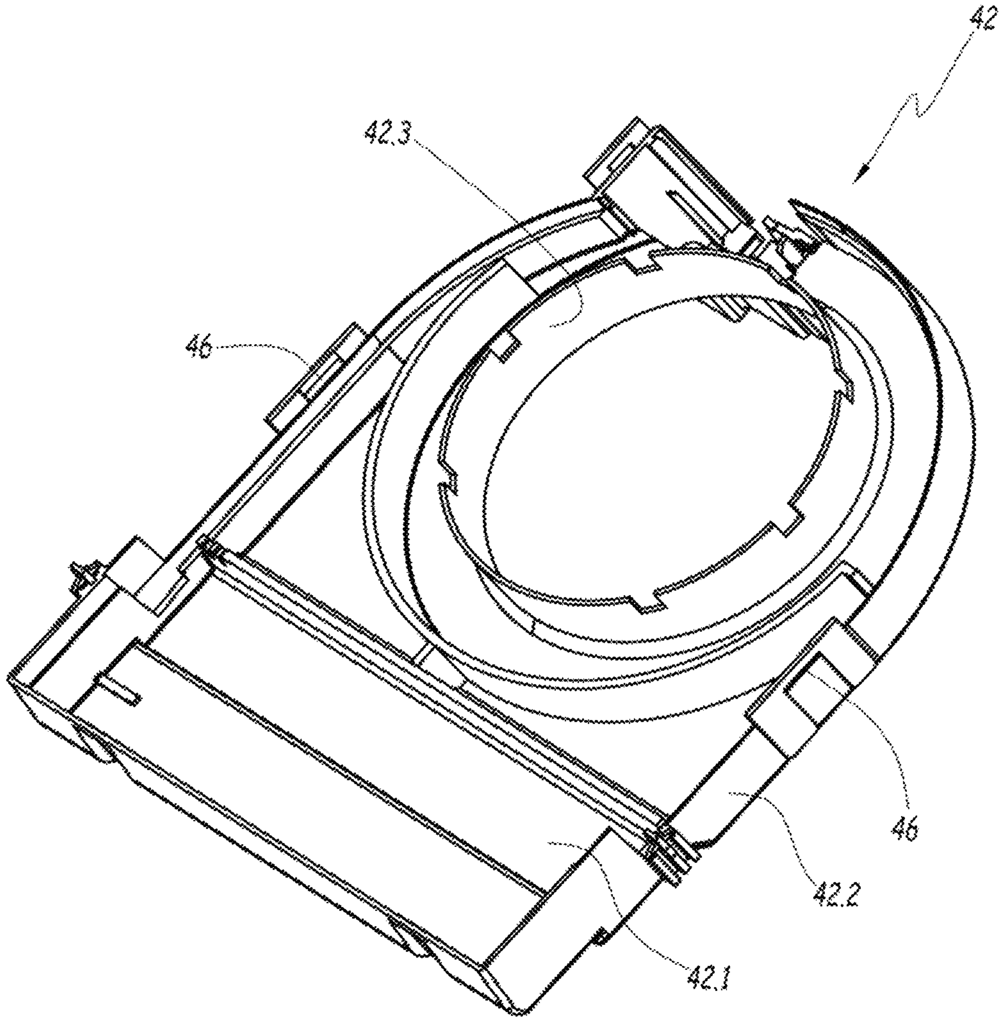
FIG. 9 is a view similar to FIG. 8 showing a second half-housing of the non-electrical device.

As clearly visible in FIGS. 3 and 5 the half-housings 41 and 42 delimit between them an internal volume V40 that is separated from the passage 43, surrounding the latter all around the axis X43. In the embodiment considered in the figures the internal volume V40 is not distributed homogeneously all around the passage 43, for reasons linked to the substitute "dummy sensor" function of the non-electrical device 40. To be more precise, as indicated in FIG. 5, the internal volume V40 therefore consists of two adjoining sub-volumes, namely an annular sub-volume V40.1 directly around the passage 43 and a remote sub-volume V40.2 that is farther from the axis X43 than the annular sub-volume V40.1. The annular sub-volume V40.1 extends all around the axis X43 whereas the remote sub-volume V40.2 extends only partly around the axis X43.

In accordance with an embodiment that is practical and simple to implement each of the two half-housings 41 and 42 includes a bottom wall 41.1, respectively 42.1, that extends globally transversely, or even perpendicularly, to the axis X43 and through which the passage 43 passes completely. The bottom walls 41.1 and 42.1 are disposed facing one another along the axis X43 and each separates the internal volume V40 from the outside of the non-electrical device 40. The half-housing 41 also includes a peripheral lateral wall 41.2 and a central lateral wall 41.3 each of which extends from the bottom wall 41.1 substantially parallel to the axis X43 toward the half-housing 42, the peripheral lateral wall 41.2 being farther from the axis X43 than the central lateral wall 41.3. The peripheral lateral wall 41.2 follows the peripheral contour of the bottom wall 41.1 whereas the central lateral wall 41.3 follows the contour of the passage 43 through the bottom wall 41.1. Similarly, the half-housing 42 includes a peripheral lateral wall 42.2 and a central lateral wall 42.3 each of which extends from the bottom wall 42.1 in a manner substantially parallel to the axis X43 toward the half-housing 41, the peripheral lateral wall 42.2 being farther from the axis X43 than the central lateral wall 42.3. The peripheral lateral wall 42.2 follows the peripheral contour of the bottom wall 42.1 whereas the central lateral wall 42.3 follows the contour of the passage 43 through the bottom wall 42.1. In the assembled state of the non-electrical device 40 the peripheral lateral walls 41.2 and 42.2 separate the internal volume V40 from the outside of the non-electrical device 40 whereas the central lateral walls 41.3 and 42.3 separate the passage 43 from the internal volume V40. Here the annular sub-volume V40.1 is simultaneously delimited by the entirety of the central lateral walls 41.3 and 42.3, a part of the bottom walls 41.1 and 42.1, and a part of the peripheral lateral walls 41.2 and 42.2, whereas the remote sub-volume V40.2 is simultaneously delimited by the rest of the bottom walls 41.1 and 42.1 and the rest of the peripheral lateral walls 41.2 and 42.2.

Whatever the specific features of the half-housings 41 and 42, the non-electrical device 40 incorporates arrangements aimed at reinforcing its integrity so that it withstands without damage the pressure surge created by the formation of an electrical arc in the arc extinguishing chamber 24 when the contact elements 20 and 21 open. To this end the half-housing 41 incorporates by moulding mechanical reinforcing elements 44 each of which extends substantially parallel to the axis X43 in the internal volume V40 until it comes into contact with the half-housing 42 in such a manner as to support the latter by contact. In accordance with a preferred embodiment which is depicted in the figures outside the mechanical reinforcing elements 44 the internal volume V40 is left substantially empty, in particular being free of any added resin or, more generally, any added filler material.

The mechanical reinforcing elements 44 are therefore in one piece with the rest of the half-housing 41. In the embodiment depicted in the figures each of the mechanical reinforcing elements 44 therefore projects along the axis X43 from the bottom wall 41.1, and this from an end 44.1 of the mechanical reinforcing element 44 at the level of the junction of the latter with the bottom wall 41.1 to a free end 44.2 of the mechanical reinforcing element 44 that is axially opposite its end 44.1. In the assembled state of the non-electrical device 40 the respective free ends 44.2 of the mechanical reinforcing elements 44 are in contact along the axis X43 with the bottom wall 42.1 of the half-housing 42, therefore supporting that bottom wall 42.1 by contact.

In accordance with an optional advantageous arrangement aimed at reinforcing their individual mechanical strength, each mechanical reinforcing element incorporates by moulding ribs 44.3 each of which extends from the bottom wall 41.1 over the entire axial extent of the mechanical reinforcing element 44, in other words each of which extends from the end 44.1 to the end 44.2 of the mechanical reinforcing element 44. Here there are four of these ribs 44.3 on each of the mechanical reinforcing elements 44. Moreover, the ribs 44.3 of each mechanical reinforcing element 44 are advantageously distributed on the mechanical reinforcing element 44 around the axial direction in which that mechanical reinforcing element 44 extends between its ends 44.1 and 44.2.

In accordance with a particularly effective arrangement which is depicted in the figures at least some of the mechanical reinforcing elements 44 are divided into one or more groups, here two groups G1 and G2, in each of which all the mechanical reinforcing elements 44 are aligned in a direction transverse to the axis X43, in particular orthogonal to that axis X43. As clearly divisible in FIGS. 7 and 8, all the mechanical reinforcing elements 44 of the group G1 and all the mechanical reinforcing elements 44 of the group G2 are advantageously disposed in the remote sub-volume V40.2. In this way the mechanical reinforcing elements 44 of the groups G1 and G2 act efficaciously in a region of the internal volume V40 in which the mechanical stresses exerted on the non-electrical device 40 by the aforementioned pressure surge are the highest.

Various preferred arrangements, combinable with one another may be envisaged to reinforce the action of each of the groups G1 and G2. In accordance with one of those preferred arrangements each of the groups G1 and G2 consists of at least three mechanical reinforcing elements 44, here five and six mechanical reinforcing elements 44, respectively, which are distributed in a substantially regular manner in the direction of alignment of the reinforcing elements 44 in each group G1, G2. In accordance with another preferred arrangement the mechanical reinforcing elements 44 of each of the groups G1 and G2 are made in one piece with one another, in particular by joining of one of their ribs 44.3 in pairs.

It will be noted that in the embodiment depicted in the figures one of the mechanical reinforcing elements 44 belongs neither to the group G1 nor the group G2. Here this mechanical reinforcing element 44 is disposed in the annular sub-volume V40.1. In a variant that is not represented this mechanical reinforcing element 44 is omitted, which amounts to saying that all the mechanical reinforcing elements 44 then belong to one or the other of the groups G1 and G2.

Moreover, the moulded design of the half-housings 41 and 42 is advantageously exploited where the fixed joining between these two half-housings is concerned. To be more precise, in the embodiment depicted in the figures the half-housing 41 incorporates by moulding projecting elements 45 that are disposed outside the internal volume V40 and are in particular integrated into the peripheral lateral wall 41.2. These projecting elements 45 are designed so that when assembling the half-housings 41 and 42 they clip into respective recesses 46 which are complementary to the projecting elements 45 and are formed outside the internal volume V40 in the half-housing 42, in particular in its peripheral lateral wall 42.2.

Finally, diverse arrangements and variants of the switch-disconnector 1 and the non-electrical device 40 described thus far can be envisaged. For example, the different variants referred to at different places in the above description may be at least partially combined with one another.

The invention claimed is:

1. A non-electrical device for replacing a current sensor in an arc-extinguishing chamber of a switch-disconnector, the non-electrical device comprising first and second half-housings which:

- are produced in a plastic material,
- are joined fixedly to one another,
- define an axis along which a passage for an electrical conductor passes through the first and second half-housings, the passage being substantially centered on the axis, and
- delimit between them an internal volume which is separated from the passage and which surrounds the passage all around the axis, in which the first half-housing incorporates by moulding mechanical reinforcing elements which extend substantially parallel to the axis in the internal volume until they are in contact with the second half-housing.

2. The non-electrical device according to claim 1, in which the non-electrical device consists of first and second half-housings.

3. The non-electrical device according to claim 1, in which the internal volume is, apart from the mechanical reinforcing elements, left substantially empty, in particular being free of any added resin.

4. The non-electrical device according to claim 1, in which at least some of the mechanical reinforcing elements belong to at least one group all the mechanical reinforcing elements of which are aligned in a direction transverse to the axis.

5. The non-electrical device according to claim 4, in which the volume consists of two adjoining sub-volumes, namely:

- an annular sub-volume that directly surrounds the passage and extends all around the axis, and
- a remote sub-volume that is farther from the axis than the annular sub-volume and extends only partly around the axis,
- and in which all the mechanical reinforcing elements of the or each group are disposed in the remote sub-volume.

6. The non-electrical device according to claim 4, in which the or each group consists of at least three mechanical reinforcing elements that are substantially regularly distributed in said direction transverse to the axis.

7. The non-electrical device according to claims 4, in which the mechanical reinforcing elements of the or of each group are in one piece.

8. The non-electrical device according to claim 1, in which the first and second half-housing include respective bottom walls that are disposed facing one another along the axis and each of which separates the internal volume from the outside of the non-electrical device, and in which each mechanical reinforcing element projects along the axis from the bottom wall of the first half-housing to a free end of the mechanical reinforcing element, that free end being in contact along the axis with the bottom wall of the second half-housing.

9. The non-electrical device according to claim 8, in which each of the mechanical reinforcing elements incorporates ribs each of which extends from the bottom wall of the first half-housing to the free end of the mechanical reinforcing element.

10. The non-electrical device according to claim 1, in which the first half-housing incorporates by moulding projecting elements that are disposed outside the internal volume and are adapted during assembly of the first and second half-housings to be clipped into complementary recesses provided by the second half-housing outside the internal volume.

11. A switch-disconnector including one or more poles and an insulating enclosure that supports the pole or poles, in which the or each pole includes:

- two terminal pads that are carried by the enclosure and that can be connected from outside the enclosure to an electrical circuit to be isolated by the switch-disconnector,
- two contact elements that are disposed in an arc distinguishing chamber delimited inside the enclosure and are respectively connected to the terminal pads, while being movable relative to one another into a closed position in which the contact elements are in direct contact with one another and an open position, in which the contact elements are separated from one another,
- a mechanism that is arranged inside the enclosure, controlled from outside the enclosure and adapted to move the contact elements from the closed position to the open position, and
- a non-electrical device according to claim 1 arranged in the arc extinguishing chamber in such a manner that one of the two terminal pads is received in the passage, extending substantially parallel to the axis.

12. The switch disconnector according to claim 11, in which the first half-housing is directly intercalated along the axis between the enclosure and the second half-housing.

* * * * *